Aug. 18, 1970 C. E. MARTIN 3,524,585

CARD PUNCH PIN POSITION DETECTION SYSTEM

Filed Nov. 18, 1968 2 Sheets-Sheet 1

United States Patent Office 3,524,585
Patented Aug. 18, 1970

3,524,585
CARD PUNCH PIN POSITION DETECTION SYSTEM

Clifford E. Martin, Kulpsville, Pa., assignor to Sperry Rand Corporation, New York, N.Y., a corporation of Delaware Filed Nov. 18, 1968, Ser. No. 776,558
Int. Cl. G06k *1/05, 5/02*
U.S. Cl. 234—33 4 Claims

ABSTRACT OF THE DISCLOSURE

A punch check system is provided in which a tooth formed on a punch pin confronts the core of a differential transformer and operates to shift the transformer from a balanced to an unbalanced condition when the punch pin and therefore the punch pin tooth is moved during a punching operation. An oscillator is coupled to the primary of the differential transformer, and a signal level detector is coupled to the transformer secondary so that when the transformer is shifted from a balanced to an unbalanced condition an output is produced from the level detector to thereby indicate actuation of the punch pin.

This invention relates to a punch checking system for a card or a paper tape punch and the like.

Punch checking for card punches and the like is not new per se. One form of punch checking involves the use of a read station which follows the punch station and wherein the information punched is detected and compared for equality with the information previously presented for punching. If the information read at the read station differs from that presented for punching, an error condition is detected. Such a system is expensive in that the punching information must be stored until the card can be moved to the reading station.

An alternate form of punch checking involves a variable reluctance pick up device. In this scheme one side of each of the punch pins is provided with a recess. In the unactuated position of the pin, the recess is disposed opposite the pole piece of a variable reluctance pick up device. The variable reluctance device comprises a permanent magnet and a magnetic path which is completed through the punch pin. A coil is disposed about the pole piece of the magnetic system and the flux linking the coil is a function of the reluctance of the path. When the punch pin is moved into a punching position, the recessed portion of the punch pin is displaced from the pole piece to thereby reduce the magnetic reluctance of the system and vary the field linking the coil. The change in the field linking the coil induces a voltage therein and the polarity of the voltage is a function of whether this field is increasing or decreasing. Upon each actuation of a particular pin its associated coil produces a voltage first of one and then the other polarity as the magnetic reluctance of the path is decreased when the pin is actuated and is increased when the pin is returned to its unactuated position. A detection circuit is used to detect the voltage induced in the pick up coil and to thereby indicate the actuation of a pin.

A system such as that just outlined suffers from certain disadvantages which effect the reliability of its operation. For example, to make sure that the movement of the punch pin has effected a punched hole the pin should be sensed at a point near its fully actuated position. At this point, however, the pin velocity is approaching a minimum condition and since the signal developed in the variable reluctance pick up coil is a function of pin velocity a low level signal is developed at this point. A further disadvantage rests in the fact that the pins themselves, whether they are in an actuated or unactuated condition, quite frequently undergo substantial transverse vibration due to the mechanical impact of the punch bails etc. in the punch. This vibration in the punch pin produces a variation in the gap between the reluctance pick up device and the pin to thereby induce unwanted noise signals in the pick up device.

It is therefore the purpose of this invention to provide a simple, inexpensive, reliable punch checking system which is free of the aforementioned disadvantages.

SUMMARY OF THE INVENTION

In accordance with the teaching of the present invention, a punch mechanism such as shown in U.S. Pat. 3,253,778 issued May 31, 1966, to A. Hunter et al. is provided with a punch checking system. In more particular, each of the punch pins of the punch mechanism is provided with a tooth portion formed therein which in the preferred embodiment is a recessed notch although a raised portion could be used if desired. Disposed next to each of the punch pins is a separate differential transformer or proximity transducer. Each transducer comprises a bar or cylindrical core of ferro-magnetic material on which are wound primary and secondary windings. Each of the primary windings is split into two identical portions which are connected in series opposition to one another. An oscillator operating at typically five kilo-Hertz is connected in parallel to all the primary windings of the several proximity transducers. In the unactuated position of the punch pin, the air gap between the punch pin and the core of the transducer is adjusted so as to obtain a minimum signal output on the secondary windings. In this condition a balance of mutual induction exists between each of the two primary windings and the secondary winding of the proximity transducer. When a punch pin is actuated the notch or tooth portion is moved relative to the core tip of the proximity detector and the air gap is thereby changed. This action causes an unbalance in coupling between each of the two primary and the secondary windings. In the unbalanced condition of the transformer a large signal (related to the amplitude of the primary signal) is induced in the transformer secondary winding to thereby indicate that the corresponding punch pin has been moved to a position indicating penetration of the card. By comparing the pattern of punch signals with the pattern of signals developed by the proximity detectors, a condition of signal equality or non-equality can be detected and errors in punch operation sensed.

In the drawings to which reference is now made:

Figure 1:
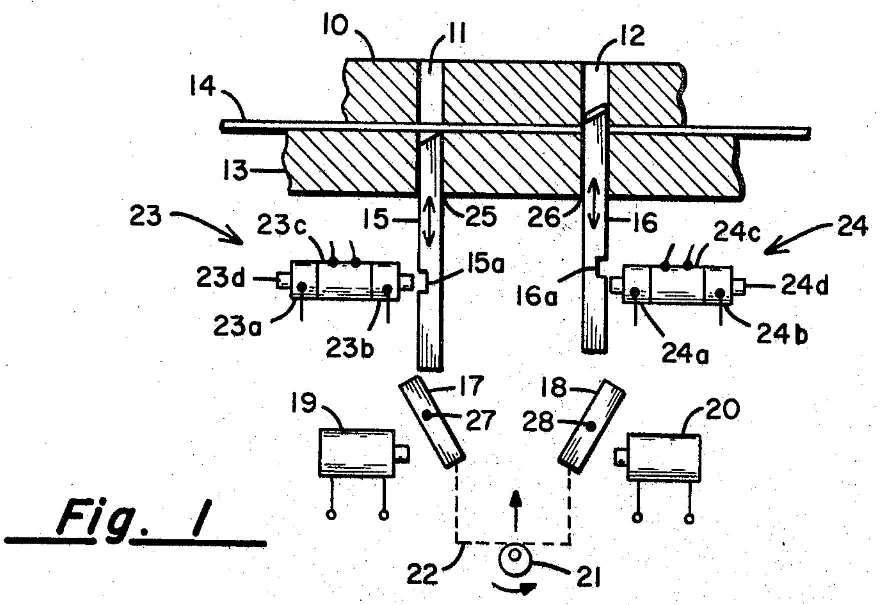
FIG. 1 is a simplified partial sectional view of a typical punch mechanism in which the present invention has been incorporated.

In FIG. 1 to which reference is now made, 10 represents a die bed in which have been formed a pair of die channels 11 and 12. Disposed beneath the die bed and spaced therefrom is a punch bed 13 in which a pair of punch guide channels 25 and 26 have been formed and into which a pair of punch pins 15 and 16 are mounted for a reciprocal punching action. A card channel is formed between the die bed 10 and the punch bed 13 and a card 14 is shown in the card channel ready to be punched. To control the actuation of the punch pins 15 and 16 a pair of interposer elements 17 and 18 are provided. These interposer elements are driven typically from an eccentric cam 21 which is continuously rotated by a motor means not shown. The eccentric 21 mechanically actuates the interposers 17 and 18 as indicated by the dotted line 22 so that the interposers are normally oscillated in a vertical direction at a rate determined by the rotational rate of the cam 21. In the unactuated condition, the interposers 17 and 18 are held out of alignment with respect to the punch pins 15 and 16, so that they do not engage the punch pins and no movement of the punch pins results. To actuate the punch pins, an interposer solenoid 19, 20 is associated with each of the interposers 17, 18. Each of the interposers 17, 18 is arranged so that upon energization of the corresponding solenoid 19, 20, the respective interposer will rotate about its pivot point 27, 28 to a position where the interposer will be in vertical alignment with the corresponding punch pin 15 and 16. In this position the eccentric 21 forces the interposer 17 and 18 into engagement with the lower ends of the punch pins 15 and 16 to cause a punching action to be produced.

The punching mechanism illustrated in FIG. 1 may be conventional in design and may correspond, for example, to the mechanism shown in the aforementioned Hunter et al. patent. Also, in a practical application the punch pin 15 may be representative of a complete column of 12 punch pins arranged transversely across a card so as to punch one complete card column at a time. Similiarly, the punch pin 16 may represent a second column of punch pins also arranged transversely across the card so as to punch a second complete card column at the same time as the first column.

To detect the position of the punch pins 15 and 16 and in accordance with the present invention, a separate proximity transducer 23, 24 is associated with each of the punch pins 15, 16. As illustrated in FIG. 1 and also in FIG. 2 to which reference is now also made, the proximity transducers comprise a pair of primary windings **23*a*, 23*b* and 24*a*, 24*b* each of which may be wound on a multilayer bobbin and assembled on a cylindrical, magnetic core 23*d*, 24*d* at the opposite ends thereof. Also as shown, each of the transducers comprises a secondary winding 23*c*, 24*c* which is centrally located with respect to the primary windings and may also be in the form of a multilayer bobbin threaded on the core 23*d*, 24*d***.

Figure 2:
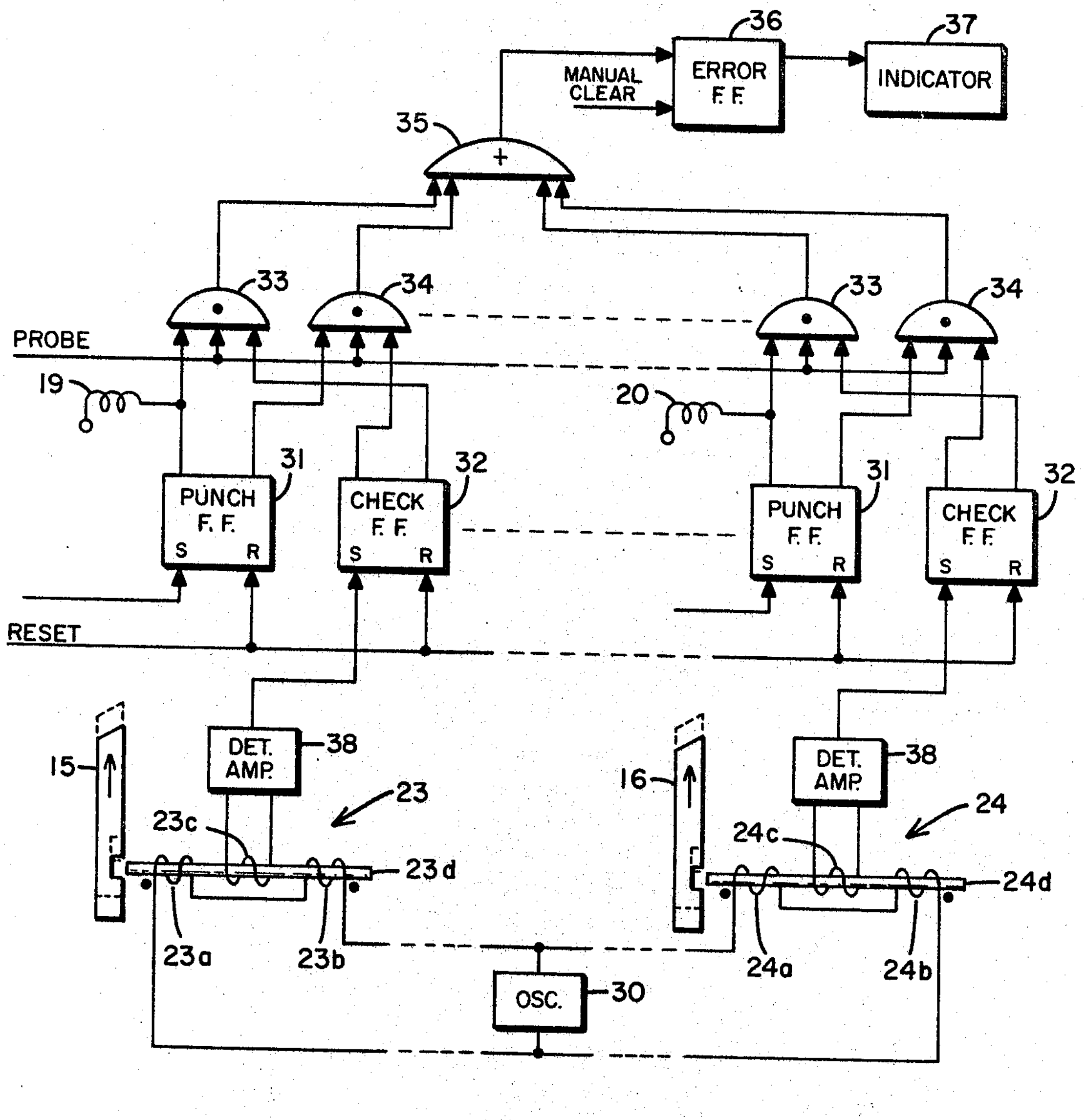
FIG. 2 is a simplified block diagram showing a portion of the details of the punch checking circuit included in this invention.

The primary windings of all the proximity transducers are connected in parallel and to an oscillator 30 as shown in FIG. 2. The secondaries are each connected to a corresponding threshold detector amplifier 38 which is biased to a level which is directly related to the input voltage from the oscillator so as to produce an output when the transformers are unbalanced. A notch **15*a*, 16*a*, typically .01 inch deep, is formed in each punch pin and is disposed opposite the core 23*d*, 24*d* of the transformer when the associated pin is in an unactuated position. The proximity transducers are then adjusted to or away from the notch until a balanced primary-secondary coupling condition with the pin in an unactuated position is achieved. This can be determined by placing an oscilloscope on the secondary winding of the associated proximity transduced and by making the adjustment of the proximity transducer to achieve a minimum signal in the secondary or preferably by moving the punch pins to the up position and after reducing the oscillator output to its operating amplitude, adjust the proximity transducer to produce a circuit output from amplifier 38. In a typical embodiment where the punch pins were made of ferromagnetic material each of the transformers 23, 24** comprised an active core of .032 inch in diameter and a length of .875 inch. The notch was .010 deep and .110 inch long and was so located on the pin so that when the pin was in a fully actuated position the notch rose above the tip of the transformer core as shown in dotted lines in FIG. 2.

Reference is now made in particular to FIG. 2 where the structure and operation of the checking circuit will be described as applied to a double column (24 pin) punch. As shown in this figure the checking circuit includes a first group of 24 punch flip-flops 31, one for each of the punch pins in the punch. The set output of each of these flip-flops 31 is connected to and controls the energization of its corresponding interposer solenoid 19, 20. Also included in the circuit are a set of 24 check flip-flops 32, one for each of the pin positions in the punch. The set output of each of the first group of 24 flip-flops 31 is connected to one input of a three-input AND gate 33 and the reset output of each of the check flip-flops 32 is connected to another input of each of the first group of 24 gates 33. The third input for each of these gates is provided with a probe signal which is produced by the control equipment of the punch which is not shown but is related in time to the punch pin top dead center position. Further included are a second set of three-input AND gates 34 each of which receives the reset output of a respective one of the punch flip-flops 31; the set output of a respective one of the check flip-flops 32; and the probe signal. The outputs of each of the gates 33 and 34 are all buffed together in an OR gate 35 and applied to the set input of an error flip-flop 36. The set output of the error flip-flop is used to drive an indicator 37 such as a neon tube, an alarm, or the like. Connected to each set input of the first group of 24 flip-flops 31 is a punch signal for controlling the operation of that particular punch pin. These signals may be derived from a memory or the like in the control equipment for the punch mechanism. All of the reset inputs for both groups of flip-flops 31 and 32 are connected together and to a reset line which receives a reset signal also from the control equipment. The set input of each of the check flip-flops 32 is derived from the output of the amplifier detector circuit 38 of a respective one of the punch pin proximity transducer circuits.

Figure 3:
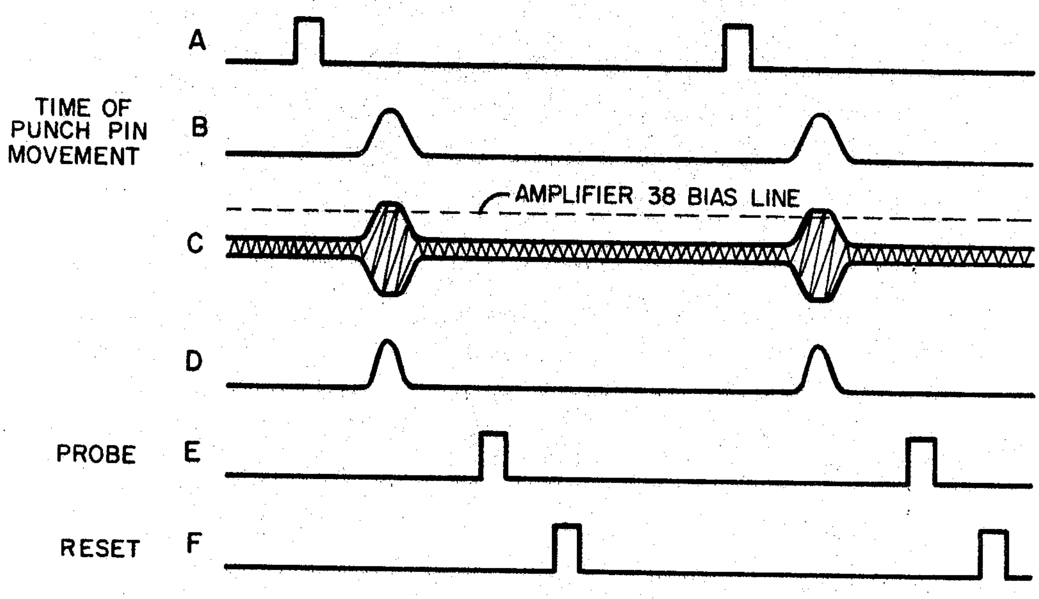
FIG. 3 shows a series of timing diagrams useful in explaining the operation of the present invention.

To illustrate the operation of the checking system shown in FIG. 2, reference will now be made to the timing diagrams shown in FIG. 3 in conjunction with the circuitry shown in FIG. 2. To begin with assume that all of the flip-flops 31 and 32 have been triggered to a reset condition, by a reset signal. Then at some point in time as illustrated by waveform A of FIG. 3, a punch signal is applied to the set input of each of the set flip-flops 31 where it is desired to produce a punched hole in the card. Assume for example, that holes are to be punched in positions 1 and 24. In this case a punch signal would be applied to the set input of the first and twenty-fourth flip-flop 31 to key these two flip-flops to their set condition. Setting the first and twenty-fourth flip-flops will energize the corresponding interposer solenoids 19, 20 and will at the same time provide an enabling signal for the first and twenty-fourth gates 33 since at this time both the punch flip-flop and its corresponding check flip-flop will be in the proper setting to enable these gates. At a later point in time the eccentric 21 will reciprocate the interposers 17 and 18 as indicated by the timing of waveform B to produce the desired punching action. Actuation of the punch pins 15 and 16 to their dotted positions shown in FIG. 2 will shift the notch in each of these pins away from the tips of the cores **23*d* and 24*d* of the transducers 23 and 24 so as to unbalance these transducers. The unbalancing of the transducers will then produce the output shown in FIG. 3, waveform C, which shows the output as developed at the secondary winding of each of the actuated detector circuits. The secondary outputs from the detectors are fed through the detector and amplifier arrangements 38 which function to detect the peaks of the signals shown by waveform C and to deliver an output to the set terminal of the corresponding punch check flip-flops 32 as shown by waveform D. The first and twenty-fourth check flip-flops 32 will then be triggered to the set condition by the waveform shown in FIG. 3 to thereby remove the enabling signal from the gates 33. At a point following this action in time and as shown by waveform E, the control equipment emits a probe pulse to the gates 33 and 34. In the assumed example where pins 1 and 24 were to be actuated and were indeed actuated, the probe signal will arrive at gates 33 and 34 and will find these gates disabled and no outputs will be produced from the buffer 35. Following this point in time the reset pulse as illustrated in waveform F is emitted by the control to again reset all the flip-flops 31 and 32** in preparation for the next punching cycle.

Now assume that the same two punches are to be actuated, namely, punches 1 and 24, and that punch 1 for some reason fails to move and that punch 24 does move as commanded. In this condition both the 1st and 24th flip-flops 31 are set by the command signals enabling the corresponding gates 33. At the time illustrated by waveform D, the detector amplifier 38 associated with the 24th punch produces an output to set flip-flop 32 and to thereby disable gate 33. In contrast, however, the detector amplifier 38 associated with pin 1, fails to produce such an output so that flip-flop 31 is set and flip-flop 32 remains reset keeping gate 33 open. At the time indicated by waveform E the probe signal passes through gate 33 and buffer 35 to set the error flip-flop to indicate an error had been produced. Before proceeding with further punching operation the system must be cleared. This can be done by the operator punching a manual clear button in the control panel to thereby reset the error flip-flop 36.

Now assume that the punching operation calls for pin 24 to be actuated and that pin 1 is not to be actuated but is fortuitously moved. In this condition, flip-flop 31 associated with the first pin is in the reset condition whereas flip-flop 31 associated with 24 is in the set condition. The actuation of pin 1 sets the flip-flop 32 to fully condition gate 34 which is in error. At probe time, gate 34 is operative and the probe signal passes through gate 34 and buffer 35 to set the error flip-flop 36 and thereby indicate an error condition.

From the foregoing description many modifications will occur to those skilled in the art. For example, non-magnetic punch pins may be used if a suitable excitation frequency is utilized for the oscillator 30.

I claim:

1. In a punch check system combination comprising, a punch pin having a tooth portion formed therein, means for moving said punch pin from a first position to a second position to effect a punching operation thereby, a proximity transducer located along the path of travel of said punch pin adjacent to said tooth portion whereby when said punch pin is in one of its positions said tooth portion will be opposite said transducer and when said punch pin is in its other position said tooth portion will be displaced from said transducer, said proximity transducer comprising a core member on which primary and secondary windings have been wound, one of said windings comprising two coil portions, said two coil portions being positioned on said core member and said core member being positioned relative to said primary and secondary windings and said punch pin so as to establish, when said pin is in one of its positions, a balanced coupling condition between said two coil portions of said one winding and the other winding and an unbalanced coupling condition when said pin is in its other position, an oscillator coupled to said primary winding, and a signal detection means coupled to said secondary winding to detect an output signal from said secondary and thereby to detect the position of said pin.

2. The combination set forth in claim 1 where there is included a plurality of punch pins and a plurality of proximity transducers and a single oscillator for driving the primary winding of each of said proximity transducers in parallel.

3. The combination of claim 2 wherein a first plurality of said punch pins are located in a first column and a second plurality of said pins are located in the second column.

4. The combination of claim 1 wherein said tooth portion is a recess and said balanced coupling occurs when said recess is located opposite said proximity transducer.

References Cited

UNITED STATES PATENTS

| | | | |
|---|---|---|---|
| 3,159,337 | 12/1964 | MacNeill et al. | 234—33 |
| 3,430,529 | 3/1969 | McMonagle | 234—33 X |
| 3,452,926 | 7/1969 | Bradley | 234—34 |

WILLIAM S. LAWSON, Primary Examiner

U.S. Cl. X.R.

234—115